United States Patent
Berger et al.

(10) Patent No.: US 12,557,089 B2
(45) Date of Patent: Feb. 17, 2026

(54) SUPERIMPOSED SYSTEM INFORMATION

(71) Applicant: QUALCOMM Incorporated, San Diego, CA (US)

(72) Inventors: Peer Berger, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 495 days.

(21) Appl. No.: 18/157,389

(22) Filed: Jan. 20, 2023

(65) Prior Publication Data
US 2024/0251398 A1    Jul. 25, 2024

(51) Int. Cl.
*H04W 72/044*  (2023.01)
*H04L 5/00*    (2006.01)
*H04W 52/36*   (2009.01)
*H04W 72/54*   (2023.01)

(52) U.S. Cl.
CPC ....... *H04W 72/0473* (2013.01); *H04L 5/0048* (2013.01); *H04W 52/36* (2013.01); *H04W 72/54* (2023.01)

(58) Field of Classification Search
CPC . H04W 72/0473; H04W 52/36; H04W 72/54; H04W 48/12; H04W 72/1273; H04W 72/23; H04L 5/0048
See application file for complete search history.

(56) References Cited

U.S. PATENT DOCUMENTS

| | | | |
|---|---|---|---|
| 10,862,581 B2* | 12/2020 | Liu | H04L 5/14 |
| 2021/0127412 A1* | 4/2021 | Babaei | H04W 72/1273 |
| 2021/0184909 A1* | 6/2021 | Han | H04L 27/3488 |
| 2022/0183040 A1* | 6/2022 | Dudda | H04W 72/1273 |
| 2023/0126677 A1* | 4/2023 | Xue | H04W 52/34 370/329 |
| 2024/0106590 A1* | 3/2024 | Krips | H04L 25/03305 |

OTHER PUBLICATIONS

Gohary, Ramy H., and Tricia J. Willink. "Joint routing and resource allocation via superposition coding for wireless data networks." IEEE transactions on signal processing 58.12 (2010): 6387-6399. (Year: 2010).*

Hu, Jie, et al. "Integrated data and energy communication network: A comprehensive survey." IEEE Communications Surveys & Tutorials 20.4 (2018): 3169-3219. (Year: 2018).*

* cited by examiner

*Primary Examiner* — Sharad Rampuria
(74) *Attorney, Agent, or Firm* — QUALCOMM Incorporated

(57) ABSTRACT

Various aspects of the present disclosure generally relate to wireless communication. In some aspects, a user equipment (UE) may receive, from a network node, scheduling information associated with a data communication, the scheduling information indicating a resource allocation associated with the data communication. The UE may receive, from the network node, the data communication and system information that is superimposed on the resource allocation associated with the data communication. Numerous other aspects are described.

30 Claims, 11 Drawing Sheets

SUPERIMPOSED SYSTEM INFORMATION

FIELD OF THE DISCLOSURE

Aspects of the present disclosure generally relate to wireless communication and to techniques and apparatuses associated with superimposed system information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive, from a network node, scheduling information associated with a data communication, the scheduling information indicating a resource allocation associated with the data communication. The one or more processors may be configured to receive, from the network node, the data communication and system information that is superimposed on the resource allocation associated with the data communication.

Some aspects described herein relate to a network node for wireless communication. The network node may include a memory and one or more processors coupled to the memory. The one or more processors may be configured to transmit scheduling information, for a UE, associated with a data communication, the scheduling information indicating a resource allocation associated with the data communication. The one or more processors may be configured to transmit the data communication and system information that is superimposed on the resource allocation associated with the data communication.

Some aspects described herein relate to a method of wireless communication performed by a UE. The method may include receiving, from a network node, scheduling information associated with a data communication, the scheduling information indicating a resource allocation associated with the data communication. The method may include receiving, from the network node, the data communication and system information that is superimposed on the resource allocation associated with the data communication.

Some aspects described herein relate to a method of wireless communication performed by a network node. The method may include transmitting scheduling information, for a UE, associated with a data communication, the scheduling information indicating a resource allocation associated with the data communication. The method may include transmitting the data communication and system information that is superimposed on the resource allocation associated with the data communication.

Some aspects described herein relate to a non-transitory computer-readable medium that stores a set of instructions for wireless communication by a UE. The set of instructions, when executed by one or more processors of the UE, may cause the UE to receive, from a network node, scheduling information associated with a data communication, the scheduling information indicating a resource allocation associated with the data communication. The set of instructions, when executed by one or more processors of the UE, may cause the UE to receive, from the network node, the data communication and system information that is superimposed on the resource allocation associated with the data communication.

Some aspects described herein relate to a non-transitory computer-readable medium that stores a set of instructions for wireless communication by a network node. The set of instructions, when executed by one or more processors of the network node, may cause the network node to transmit scheduling information, for a UE, associated with a data communication, the scheduling information indicating a resource allocation associated with the data communication. The set of instructions, when executed by one or more processors of the network node, may cause the network node to transmit the data communication and system information that is superimposed on the resource allocation associated with the data communication.

Some aspects described herein relate to an apparatus for wireless communication. The apparatus may include means for receiving, from a network node, scheduling information associated with a data communication, the scheduling information indicating a resource allocation associated with the data communication. The apparatus may include means for receiving, from the network node, the data communication and system information that is superimposed on the resource allocation associated with the data communication.

Some aspects described herein relate to an apparatus for wireless communication. The apparatus may include means for transmitting scheduling information, for a UE, associated with a data communication, the scheduling information indicating a resource allocation associated with the data communication. The apparatus may include means for transmitting the data communication and system information that is superimposed on the resource allocation associated with the data communication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
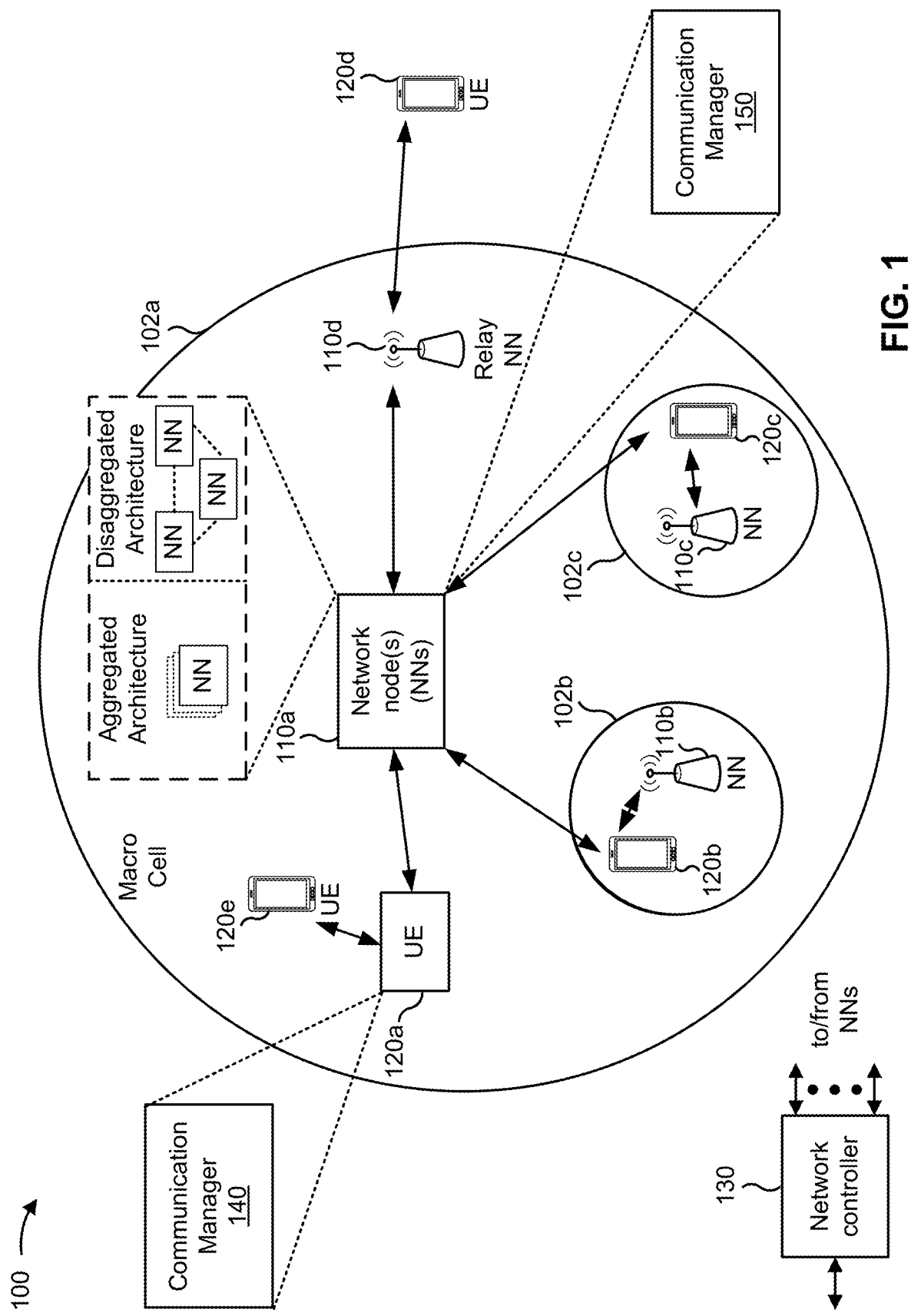
FIG. 1 is a diagram illustrating an example of a wireless network, in accordance with the present disclosure.

In some network deployments, cells may be deployed that operate using high frequency bands, such as an extremely high frequency (EHF) band, frequency range (FR)2, FR3, FR4, FR5, a sub-THz band (e.g., which may include frequencies that are multiple hundreds of gigahertz (GHz), such as 100 GHz-300 GHz), and/or other high frequency bands. These high-band cells may provide increased data capacity and/or increased throughput for user equipments (UEs) (e.g., because of an increased bandwidth associated with the high frequency bands). For example, a UE and a network node associated with a high-band cell may communicate using a larger bandwidth size, such as a 7.5 GHz bandwidth, among other examples. Communicating using the larger bandwidth size may result in an increased throughput for communications between the UE and the network node.

Radio frequency (RF) constraints and propagation properties that are unique to the high frequency bands may introduce new design challenges for wireless networks. For example, the high frequency bands may be associated with a high path loss. Therefore, to compensate for the high path loss, the network node and the UE may communicate using narrow beams (e.g., beams with a narrow beam width or signals with energy concentrated over a narrow directional range). This may result in a larger quantity of beams used by the network node to transmit over a given area (e.g., because each beam is narrower). As described elsewhere herein, the network node may transmit (e.g., may broadcast) system information (e.g., a master information block (MIB) and/or one or more system information blocks (SIB5)) over all beams used by the network node (e.g., to enable UEs in a coverage area of the network node to receive the system information). Because of the larger quantity of beams used by the network node in some network deployments, system information signaling may be associated with increased signaling overhead. For example, because of the larger quantity of beams used by the network node, a larger quantity of system information messages may be transmitted, resulting in the consumption of more network resources and increasing the latency associated with a UE receiving the system information, among other examples.

Some techniques and apparatuses described herein enable superimposed system information. For example, a network node may superimpose system information on resources (e.g., time domain resources and frequency domain resources) that are associated with data communications (e.g., unicast data communications). For example, system information may be communicated using the same time domain resources and frequency domain resources that are associated with a data communication (e.g., a physical downlink shared channel (PDSCH) communication).

For example, the network node may transmit, and the UE may receive, scheduling information (e.g., downlink control information (DCI) or other scheduling information) associated with a data communication. The scheduling information may indicate a resource allocation (e.g., time domain resources and frequency domain resources) associated with the data communication. The network node may transmit, and the UE may receive, the data communication and system information that is superimposed on the resource allocation associated with the data communication.

As a result, a signaling overhead associated with transmitting the system information is reduced. For example, the network node may be enabled to transmit system information via beams that are associated with a given UE (e.g., rather than broadcasting the system information via all beams associated with the network node). This reduces a quantity of transmissions of the system information, thereby conserving network resources, power resources, and/or other resources that would have otherwise been used transmitting (e.g., broadcasting) the system information via all beams associated with the network node. Additionally, this reduces a latency associated with the UE receiving the system information because the UE will not wait for the network node to transmit the system information over all other beams.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHZ-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the EHF band (30 GHz-300 GHz) which is identified by the International Telecommunications Union (ITU) as a "millimeter wave" band. In some examples, the higher frequency bands may include a sub-terahertz (sub-THz) frequency band. The sub-THz frequency band may include frequencies included in the FR4a, FR4-1, FR4, FR5, or higher frequencies. For example, the sub-THz frequency band may include frequencies greater than 100 GHz. In some cases, the sub-THz frequency band may include frequencies in the range of 90 GHz-300 GHz.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHZ). Each of these higher frequency bands falls within the EHF band.

With the above examples in mind, unless specifically stated otherwise, it should be understood that the term "sub-6 GHZ" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, scheduling information associated with a data communication, the scheduling information indicating a resource allocation associated with the data communication; and receive, from the network node, the data communication and system information that is superimposed on the resource allocation associated with the data communication. Additionally, or alternatively, the communication manager 140 may perform one or more other operations described herein.

In some aspects, the network node 110 may include a communication manager 150. As described in more detail elsewhere herein, the communication manager 150 may transmit scheduling information, for a UE, associated with a data communication, the scheduling information indicating a resource allocation associated with the data communication; and transmit the data communication and system information that is superimposed on the resource allocation associated with the data communication. Additionally, or alternatively, the communication manager 150 may perform one or more other operations described herein.

As indicated above, FIG. 1 is provided as an example. Other examples may differ from what is described with regard to FIG. 1.

Figure 2:
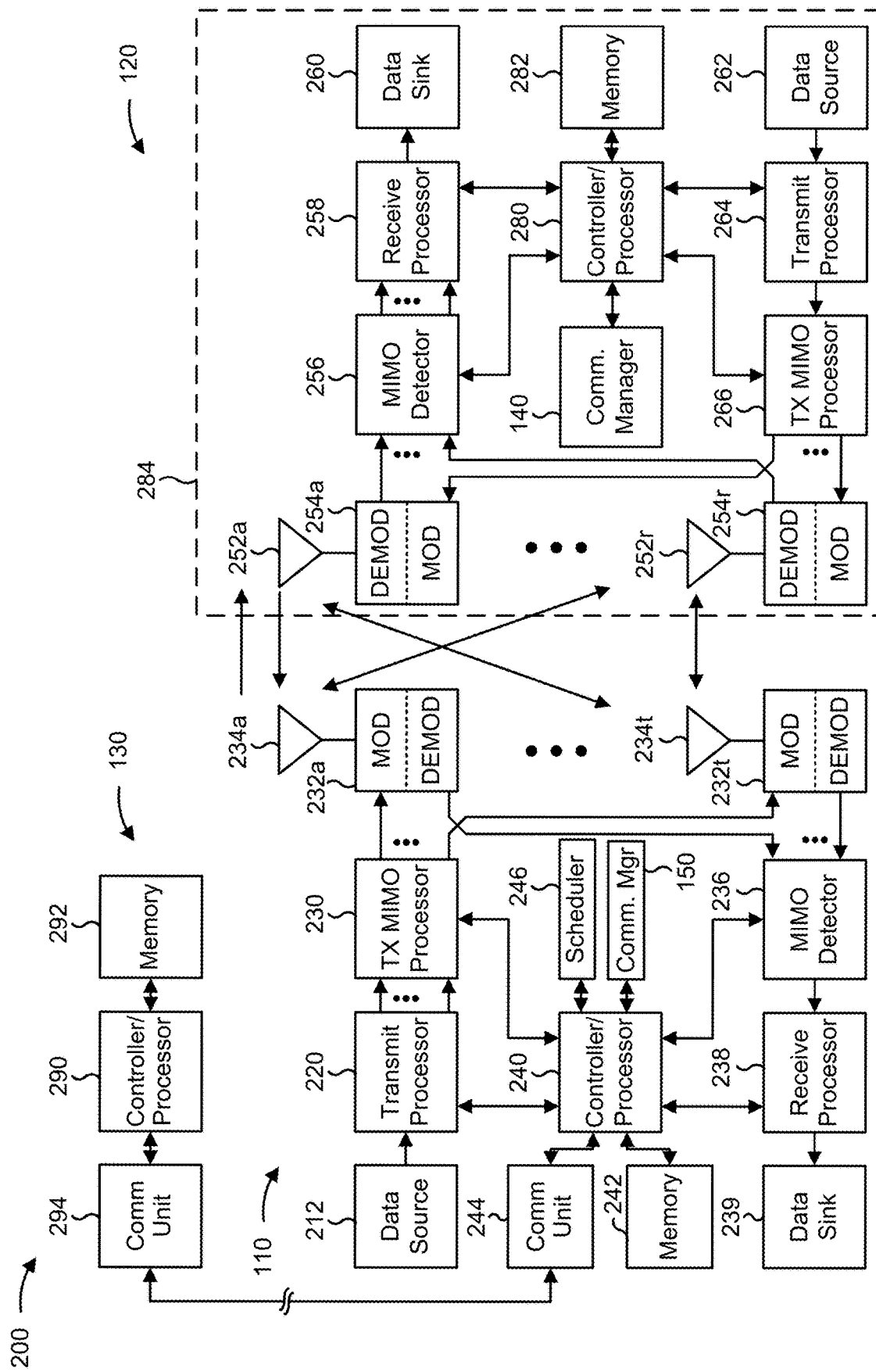
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with superimposed system information, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a network node, scheduling information associated with a data communication, the scheduling information indicating a resource allocation associated with the data communication; and/or means for receiving, from the network node, the data communication and system information that is superimposed on the resource allocation associated with the data communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting scheduling information, for a UE, associated with a data communication, the scheduling information indicating a resource allocation associated with the data communication; and/or means for transmitting the data communication and system information that is superimposed on the resource allocation associated with the data communication. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
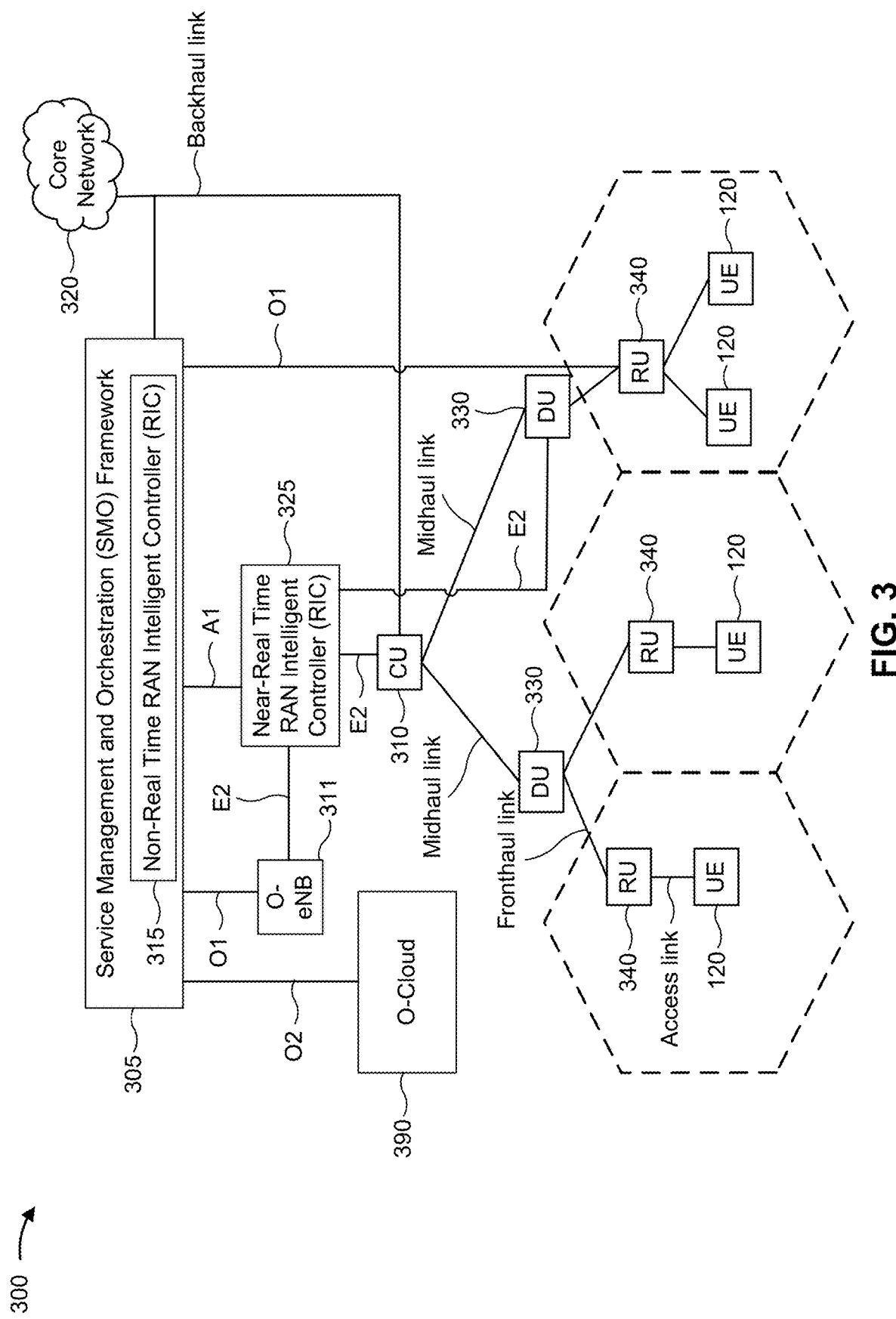
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
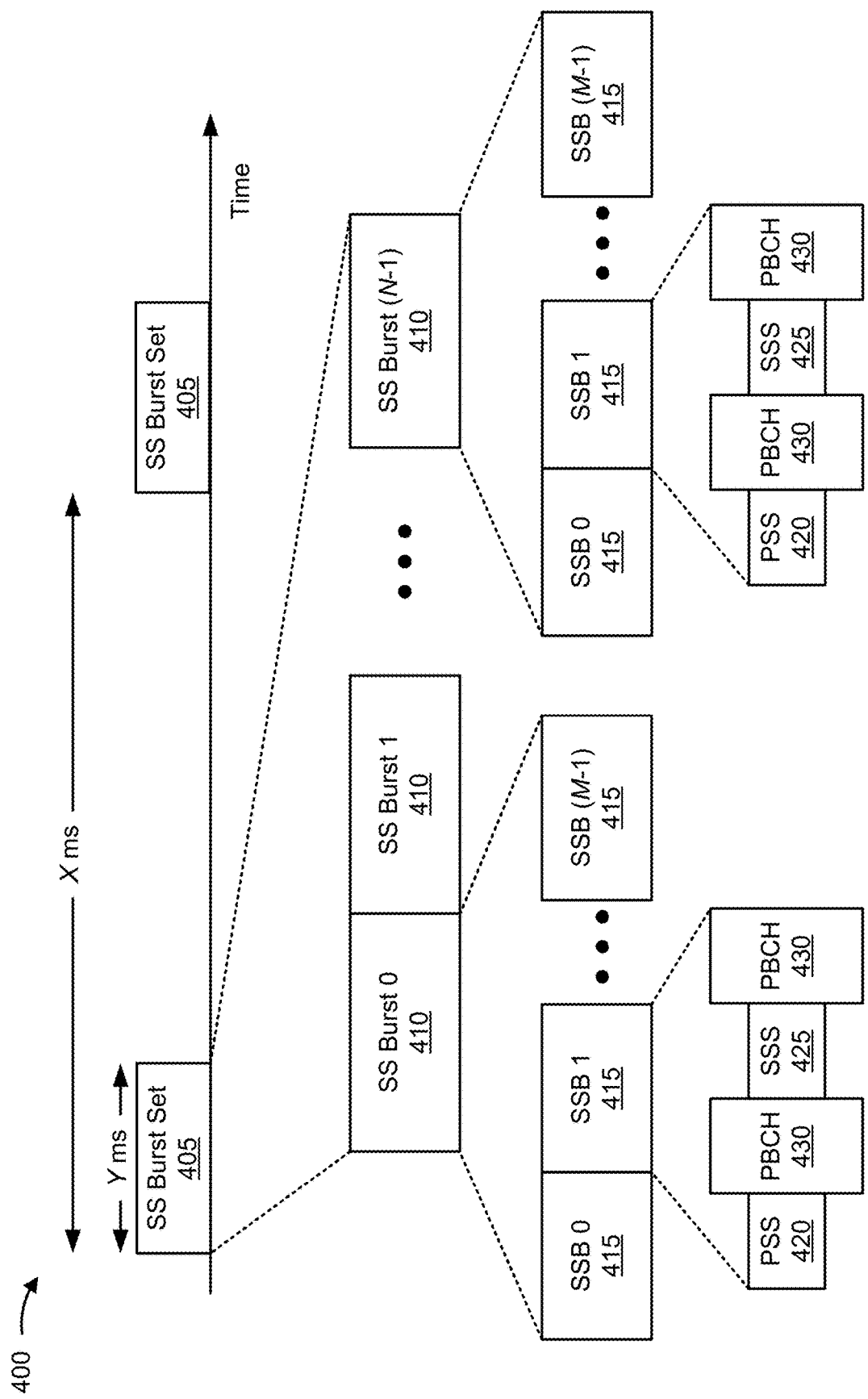
FIG. 4 is a diagram illustrating an example of a synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by one or more network nodes. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., a network node 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., a network node 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., an RSRP parameter) to a network node 110 (e.g., directly or via one or more other network nodes). The network node 110 and the UE 120 may use the one or more indicated SSBs 415 to select one or more beams to be used for communication between the network node 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

An SSB 415 may be associated with signaling to be used by a UE 120 for initial acquisition of a cell (e.g., for initially connecting with a cell). For example, the PSS 420 and the SSS 425 may include timing synchronization information for the cell. The PBCH 430 may carry system information. For example, an MIB may be communicated via the PBCH 430. The MIB may indicate information to facilitate detection and decoding (e.g., by UEs) of other system information associated with the cell. For example, the MIB may indicate information to facilitate detection and decoding (e.g., by UEs) of one or more SIBs, such as a SIB Type 1 (SIB1) (e.g., as defined, or otherwise fixed, by a wireless communication standard, such as the 3GPP), as described in more detail elsewhere herein.

As indicated above, FIG. 4 is provided as an example. Other examples may differ from what is described with regard to FIG. 4.

Figure 5:
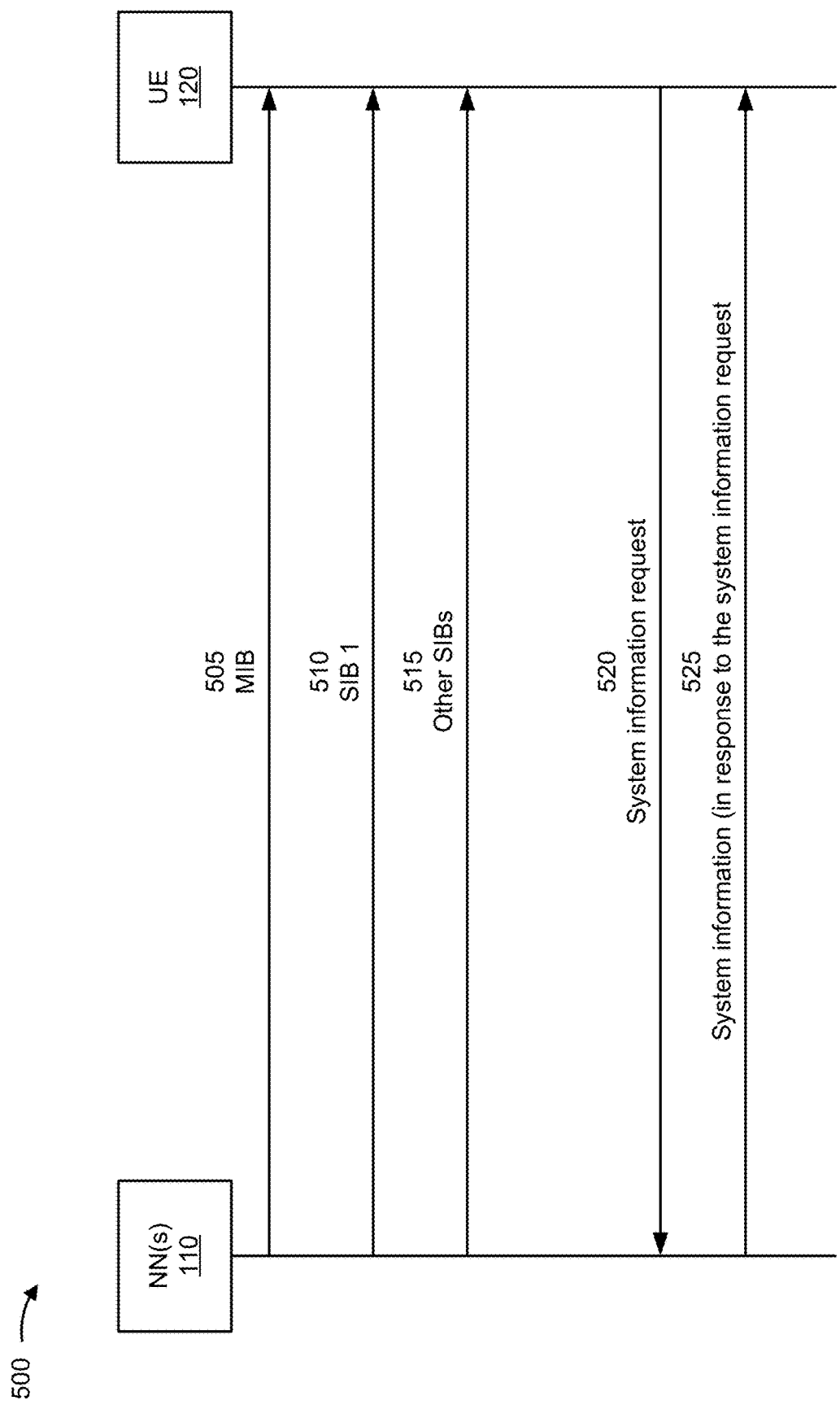
FIG. 5 is a diagram illustrating an example associated with system information signaling, in accordance with the present disclosure.

FIG. 5 is a diagram illustrating an example 500 associated with system information signaling, in accordance with the present disclosure. As shown in FIG. 5, one or more network nodes (NNs) 110 (e.g., a CU, a DU, an RU, and/or a base station) and a UE 120 may communicate with one another.

As shown by reference number 505, a network node 110 may transmit, and the UE 120 may receive, an MIB. For example, the network node 110 may transmit the MIB via a broadcast channel (e.g., via a PBCH). The network node 110 may transmit the MIB via an SSB transmission (e.g., via the PBCH included in an SSB transmission). The MIB may include information to be used by the UE 120 to decode one or more other SIBs. For example, the MIB may include information to be used by the UE 120 to decode a SIB1. The SIB1 may also be referred to as a SystemInformationBlock Type 1. For example, the MIB may include an indication of a subcarrier spacing (SCS) for the SIB1 (e.g., and for RACH communications or other system information communications), a subcarrier offset value (e.g., indicating a frequency domain offset between an SSB and an overall resource block grid in terms of a quantity of subcarriers), a control channel configuration for the SIB1 (e.g., a physical downlink control channel (PDCCH) configuration for the SIB1), and/or an indication of a position of a (first) downlink DMRS (e.g., a dmrs-TypeA-Position), among other examples. The PDCCH configuration for the SIB1 may indicate a bandwidth for the PDCCH and/or the SIB1, a common control resource set (CORESET), a common search space, and/or other PDCCH parameters.

Additionally, or alternatively, the MIB may include an indication of whether the cell is barred (e.g., a CellBarred indication). If the MIB indicates that the cell is barred, then the UE 120 may not access the cell. If the MIB indicates that the cell is not barred, then the UE 120 may attempt to access the cell (e.g., via receiving and decoding the SIB1 and/or performing a RACH procedure).

As shown by reference number 510, the network node 110 may transmit, and the UE 120 may receive, the SIB1. For example, the UE 120 may use the information indicated by the MIB to detect and/or decode the SIB1. In other words, the MIB may point to (e.g., by indicating parameters associated with) the SIB1. The SIB1 may be communicated via a downlink shared channel (e.g., with a logical channel of a broadcast control channel (BCCH)). The SIB1 may be transmitted by the network node 110 periodically, such as every 160 milliseconds. The SIB1 may be transmitted by the network node 110 via all beams (e.g., all transmit beams) associated with the network node 110 (e.g., via all SSB beams).

The MIB and the SIB1 may be referred to collectively as "minimum system information." The SIB1 may be referred to as "remaining minimum system information (RMSI)." The SIB1 may indicate information to enable the UE 120 to access the cell associated with the network node 110. For example, the SIB1 may indicate random access parameters. Additionally, the SIB1 may indicate information associated with other SIBs, such as an availability and/or scheduling of the other SIBs. The SIB1 may indicate information to enable the UE 120 to request a system information message for SIBs that are provided by the network node 110 on-demand. The information indicated by the MIB and the SIB1 may enable the UE 120 to access the cell associated with the network node 110.

As shown by reference number 515, the network node 110 may transmit, and the UE 120 may receive, other SIBs. For example, the network node 110 may periodically transmit one or more other SIBs (e.g., via the downlink shared channel). The other SIBs (e.g., not including the MIB and the SIB1) may be referred to as "other system information." For example, the other SIBs may include a SIB2, a SIB3, a SIB4, a SIB5, a SIB6, a SIB7, a SIB8, a SIB9, a SIB10, a SIB11, a SIB12, a SIB13, a SIB14, a SIB15, a SIB16, a SIB17, a SIB18, a SIB19, a SIB20, a SIB21, and/or another SIB defined, or otherwise fixed, by a wireless communication standard, such as the 3GPP. The other SIBs may indicate system information associated with the cell, such as cell reselection information, an intra-frequency neighbor cell list and reselection criteria, an inter-frequency neighbor cell list and reselection criteria, emergency notification information (e.g., earthquake & tsunami warning system (ETWS) information), time information (e.g., GPS time and/or coordinated universal time), and/or sidelink configuration information, among other examples. Other system information (e.g., other SIBs) is carried in system information (SI) messages, which may be transmitted on the downlink shared channel. The SIB1 may contain scheduling information for all SI messages. SIBs having the same periodicity may be mapped to the same SI message. Each SI message may be transmitted within periodically occurring time domain windows (e.g., referred to as "SI-windows") and a window length may be defined for all SI messages. Each SI message is transmitted one or more times within the corresponding SI-widow, and the SI-windows of different SI messages may not overlap in the time domain.

In some examples, some SIBs may be transmitted by the network node 110 on-demand (e.g., based on receiving a request for the SIB from the UE 120). For example, a broadcast status may indicate whether a SIB is broadcast (e.g., if the broadcast status is set to "broadcasting") or transmitted on-demand (e.g., if the broadcast status is set to "not broadcasting"). For example, as shown by reference number 520, the UE 120 may transmit, and the network node 110 may receive, a system information request. The system information request may indicate a SIB that is requested by the UE 120. In some examples, the SIB1 may indicate resources to be used by the UE 120 for system information requests (e.g., may indicate PRACH resources to be used by the UE 120 for system information requests). In such examples, the UE 120 may use a contention-free random access (CFRA) procedure to transmit the system information request. If the SIB1 does not indicate resources to be used by the UE 120 for system information requests, then the UE 120 may use a contention-based random access (CBRA) procedure to transmit the system information request. For example, the system information request may be communicated during a RACH procedure. As shown by reference number 525, the network node 110 may transmit, and the UE 120 may receive, system information in response to the system information request. For example, the network node 110 may transmit one or more SIBs requested by the UE 120.

In some network deployments, cells may be deployed that operate using high frequency bands, such as the EHF band, FR3, FR4, FR5, a sub-THz band (e.g., which may include frequencies that are multiple hundreds of GHz, such as 100 GHz-300 GHz), and/or other high frequency bands. The cells operating using high frequency bands may be referred to herein as "high-band cells." The high-band cells may provide increased data capacity and/or increased throughput for UEs (e.g., because of an increased bandwidth associated with the high frequency bands). For example, a UE 120 and a network node 110 associated with a high-band cell may communicate using a larger bandwidth size, such as a 7.5 GHz bandwidth, among other examples. Communicating using the larger bandwidth size may result in an increased throughput for communications between the UE 120 and the network node 110.

RF constraints and propagation properties that are unique to the high frequency bands may introduce new design challenges for wireless networks. For example, the high frequency bands may be associated with a high path loss. Therefore, to compensate for the high path loss, the network node 110 and the UE 120 may communicate using narrow beams (for example, beams with a narrow beam width or signals with energy concentrated over a narrow directional range). This may result in a larger quantity of beams used by the network node 110 to transmit over a given area (e.g., because each beam is narrower). As described elsewhere herein, the network node 110 may transmit (e.g., may broadcast) system information (e.g., a MIB and/or one or more SIBs) over all beams used by the network node 110 (e.g., to enable UEs in a coverage area of the network node 110 to receive the system information). Because of the larger quantity of beams used by the network node 110 in some network deployments, system information signaling may be associated with increased signaling overhead. For example, because of the larger quantity of beams used by the network node 110, a larger quantity of system information messages may be transmitted, resulting in the consumption of more network resources and increasing the latency associated with a UE receiving the system information, among other examples.

Some techniques and apparatuses described herein enable superimposed system information. For example, a network node 110 may superimpose system information on resources (e.g., time domain resources and frequency domain resources) that are associated with data communications (e.g., unicast data communications). For example, system information may be communicated using the same time domain resources and frequency domain resources that are associated with a data communication (e.g., a PDSCH communication).

For example, the network node 110 may transmit, and the UE 120 may receive, scheduling information (e.g., DCI or other scheduling information) associated with a data communication. The scheduling information may indicate a resource allocation (e.g., time domain resources and frequency domain resources) associated with the data communication. The network node 110 may transmit, and the UE 120 may receive, the data communication and system information that is superimposed on the resource allocation associated with the data communication. In some aspects, the system information may be other system information (e.g., associated with SIBs other than SIB1 and the MIB).

As a result, a signaling overhead associated with transmitting the system information is reduced. For example, the network node 110 may be enabled to transmit system information via beams that are associated with a given UE (e.g., rather than broadcasting the system information via all beams associated with the network node 110). This reduces a quantity of transmissions of the system information, thereby conserving network resources, power resources, and/or other resources that would have otherwise been used transmitting (e.g., broadcasting) the system information via all beams associated with the network node 110. Additionally, this reduces a latency associated with the UE 120 receiving the system information because the UE 120 will not wait for the network node 110 to transmit the system information over all other beams.

As indicated above, FIG. 5 is provided as an example. Other examples may differ from what is described with respect to FIG. 5.

Figure 6:
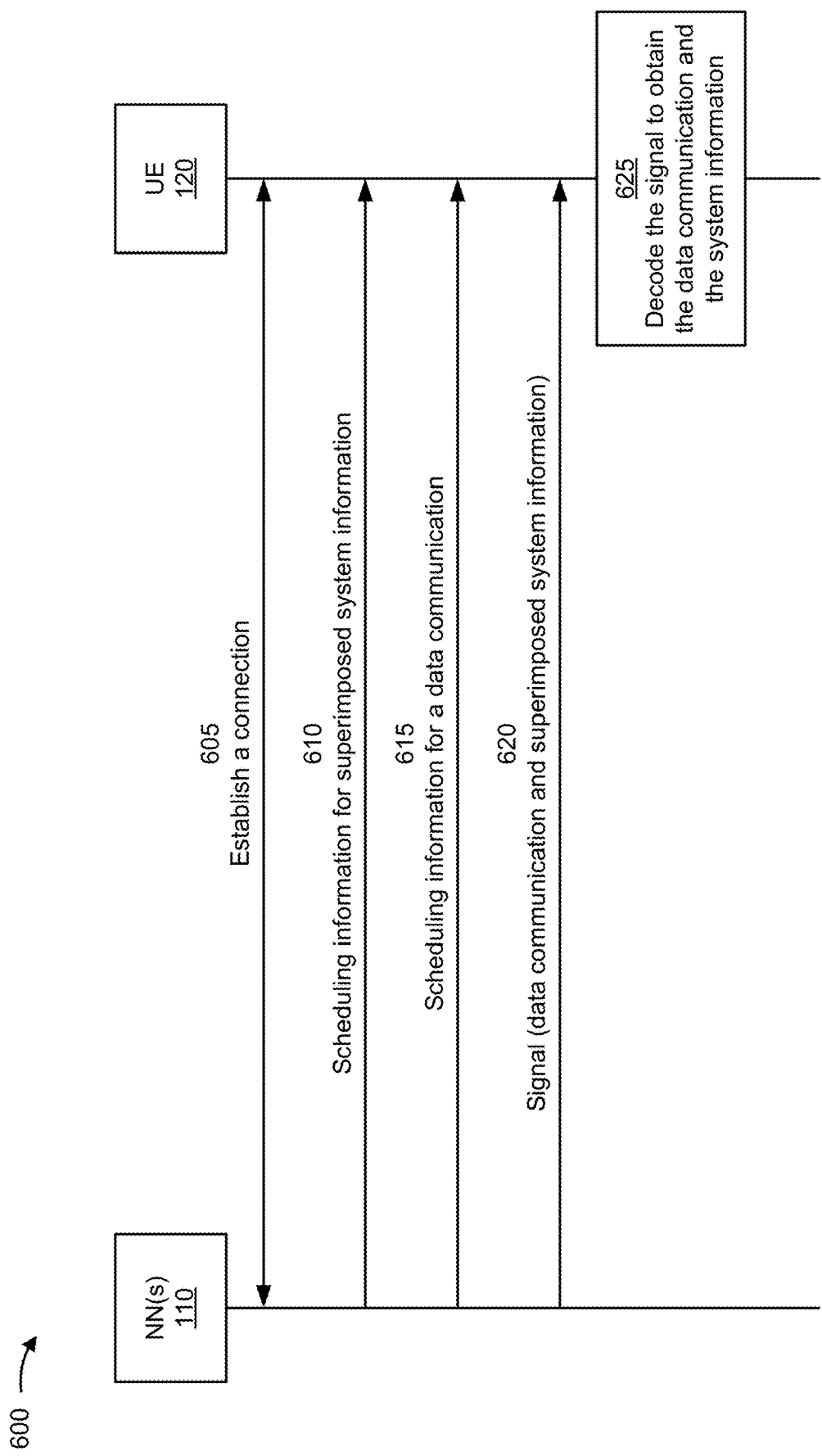
FIG. 6 is a diagram of an example associated with superimposed system information, in accordance with the present disclosure.

FIG. 6 is a diagram of an example 600 associated with superimposed system information, in accordance with the present disclosure. As shown in FIG. 6, one or more network nodes 110 (e.g., a base station, a CU, a DU, and/or an RU) may communicate with a UE 120. In some aspects, the network node 110 and the UE 120 may be part of a wireless network (e.g., the wireless network 100). The UE 120 and the network node 110 may have established a wireless connection prior to operations shown in FIG. 6. In some aspects, the UE 120 and the network node 110 may communicate using beamformed signals.

In some aspects, actions described herein as being performed by a network node 110 may be performed by multiple different network nodes. For example, configuration actions may be performed by a first network node (for example, a CU or a DU), and radio communication actions may be performed by a second network node (for example, a DU or an RU).

As used herein, the network node 110 "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU.

As shown by reference number 605, a network node 110 and the UE 120 may establish a connection. For example, the network node 110 may transmit (e.g., broadcast) minimum system information, such as a MIB and/or the SIB1. The UE 120 may use the system information to access a cell associated with the network node 110. For example, the UE 120 and the network node 110 may perform a RACH procedure to establish the connection, such as a two-step random access procedure or a four-step random access procedure.

In some aspects, the UE 120 may transmit, and the network node 110 may receive, a capability report. The capability report may indicate support for superimposed system information, as described herein. For example, the capability report may indicate that the UE 120 supports decoding system information that is superimposed on resources (e.g., radio resources) associated with a data communication. For example, the capability report may indicate that the UE 120 supports decoding system information that is superimposed on PDSCH data using the same allocation. In some aspects, the capability report may indicate a minimum allocation size (e.g., a minimum quantity of resource blocks) needed for the UE 120 to decode the superimposed system information. The network node 110 may transmit superimposed system information, as described in more detail elsewhere herein, based at least in part on the capability report indicating that the UE 120 supports receiving and/or decoding the superimposed system information (e.g., if the capability report indicates that the UE 120 does not support receiving and/or decoding the superimposed system information, then the network node 110 may refrain from transmitting superimposed system information to the UE 120).

In some aspects, the capability report may indicate whether the UE 120 supports successive interference cancellation (SIC) for decoding signals. In some aspects, the network node 110 may configure or indicate that the UE 120 is to use SIC to decode superimposed system information (e.g., as described in more detail elsewhere herein) based at least in part on the capability report indicating that the UE 120 supports performing SIC (e.g., if the capability report indicates that the UE 120 does not support performing SIC, then the network node 110 may refrain from configuring or indicating the UE 120 to use SIC to decode superimposed system information).

In some aspects, the network node may transmit, and the UE may receive, configuration information. In some aspects, the UE may receive the configuration information via one or more of system information signaling, RRC signaling, one or more MAC control elements (MAC-CEs), and/or DCI, among other examples. In some aspects, the configuration information may include an indication of one or more configuration parameters (e.g., stored by the UE 120 and/or previously indicated by the network node 110 or other network device) for selection by the UE 120, and/or explicit configuration information for the UE 120 to use to configure itself, among other examples.

In some aspects, the configuration information may indicate that the UE 120 is to receive system information (e.g., one or more SIBs) superimposed on data communications. As used herein, "superimposed" may refer to the system information being associated with the same resource allocation (e.g., the same radio resources, time domain resources, and/or frequency domain resources) as a data communication. For example, a superimposed system information communication may use the same resource allocation as a data communication (e.g., a unicast data communication associated with the UE 120). In some aspects, the configuration information may indicate one or more SIBs that are associated with superimposed system information signaling. For example, the SIB1 may indicate other SIBs that are transmitted by the network node 110 using superimposed system information signaling.

As shown by reference number 610, the network node 110 may transmit, and the UE 120 may receive, scheduling information for superimposed system information. For example, the network node 110 may transmit, and the UE 120 may receive, an indication of a timing of transmissions of system information that is to be superimposed on resource allocations associated with data communications. For example, the indication of the timing may include an indication of scheduling associated with a set of SIBs to be superimposed with data communications. The scheduling information for superimposed system information may be included in the configuration information or in a separate communication. For example, the indication of the timing may be communicated via an RRC communication or a MAC-CE communication, among other examples.

For example, the network node 110 may indicate an order in which one or more SIBs are to be transmitted via superimposed system information signaling. Additionally, the network node 110 may indicate a periodicity at which the system information is to be transmitted. For example, the network node 110 may indicate that superimposed system information is to be transmitted once every J slots, where J is greater than or equal to 1. As another example, the network node 110 may indicate that superimposed system information is to be transmitted once every Z data communications associated with the UE 120, where Z is greater than or equal to 1. Additionally, or alternatively, the network node 110 may indicate that one or more SIBs are to be transmitted via superimposed system information signaling in an on-demand manner.

The UE 120 may configure itself based at least in part on the configuration information. In some aspects, the UE 120 may be configured to perform one or more operations described herein based at least in part on the configuration information.

As shown by reference number 615, the network node 110 may transmit, and the UE 120 may receive, scheduling information for a data communication. For example, the data communication may be associated with a PDSCH. The data communication may be a unicast communication (e.g., a one-to-one communication between the UE 120 and the network node 110). In some aspects, the scheduling information may be communicated via DCI. For example, the network node 110 may transmit, and the UE 120 may receive, DCI indicating the scheduling information. The scheduling information may indicate a resource allocation associated with the data communication. For example, the resource allocation may indicate time domain resources, frequency domain resources, and/or spatial domain resources (e.g., a beam), among other examples, associated with the data communication.

In some aspects, the scheduling information (e.g., the DCI) may include an indication that the data communication is to be associated with superimposed system information. In other aspects, the scheduling information (e.g., the DCI) may not include an indication that the data communication is to be associated with superimposed system information (e.g., even if the data communication is to be associated with the superimposed system information).

In some aspects, the scheduling information may indicate a decoding technique to be used by the UE 120 to decode a signal that includes the data communication and the system information. For example, the network node 110 may transmit, and the UE 120 may receive, an indication of whether SIC is to be used to decode the signal. If the network node 110 indicates that SIC is to be used to decode the signal, then the UE 120 may decode the signal by performing SIC. If the network node 110 indicates that SIC is not to be used to decode the signal, then the UE 120 may decode the signal in a similar manner as if the signal did not include the superimposed system information (e.g., may decode the signal without using any specialized decoding techniques to obtain the superimposed system information). For example, because a size of the system information may be small compared to a size of a bandwidth of the data channel, the UE 120 may be enabled to decode the system information and the data communication (e.g., even at low signal-to-noise ratio (SNR) levels).

As shown by reference number 620, the network node 110 may transmit, and the UE 120 may receive, a signal. The signal may include the data communication and the system information. For example, the network node 110 may transmit, and the UE 120 may receive, the data communication and system information that is superimposed on the resource allocation associated with the data communication. The system information may be associated with one or more SIBs. The signal (e.g., that includes the data communication and the system information) may be communicated via the PDSCH. For example, the data communication may be a PDSCH data communication.

In some aspects, the data communication may be associated with a first signal power and the system information may be associated with a second signal power. In some aspects, the second signal power may be less than the first signal power. For example, the network node 110 may transmit the system information with a lower signal power (e.g., a lower transmit power) than the data communication. For example, the network node 110 may determine an SNR that will enable the UE 120 to decode the data communication. For example, because the UE 120 and the network node 110 have established the connection, the network node 110 may identify the MCS and rank associated with the data communication. Therefore, the network node 110 may determine the SNR (e.g., the network node 110 may determine a transmit power or a signal strength) that will enable the UE 120 to decode the data communication. The network node 110 may transmit the system information with a lower signal power (e.g., a lower SNR) to mitigate an effect on the performance of the data communication.

For example, the data communication may be associated with a first SNR and the system information may be associated with a second SNR. The first SNR may be an SNR that allows the UE 120 (e.g., the receiver) to decode the data communication (e.g., a decodable SNR level for the modem of the UE 120). For example, the code rate and/or SNR of the data communication and/or of the superimposed system information may be based at least in part on a decoding capability of the UE 120 (e.g., of a modem of the UE 120). In some aspects, the network node 110 may determine the signal power and/or SNR of the system information such that a difference between a first signal power (e.g., of the data) and a second signal power (e.g., of the system information) satisfies a threshold. For example, the threshold may be 10 decibels, among other examples (e.g., the SNR of the system information may be the difference between the signal powers). In other words, the network node 110 may transmit the system information D decibels below the SNR that enables the decoding of the data communication (e.g., so as to not affect the performance of the data communication). Therefore, the SNR of the system information may be −D decibels. In some aspects, the network node 110 may determine a code rate (or coding rate) of the system information such that the system information can be decoded by the UE 120 at the second SNR (e.g., at −D decibels). The code rate may refer to a quantity of raw data bits divided by a total quantity of bits in an encoded data stream. The network node 110 may determine the code rate for the system information based on the second SNR (e.g., to enable the UE 120 to decode the system information at the second (lower) SNR).

As shown by reference number 625, the UE 120 may decode the signal to obtain the data communication and the system information. For example, the UE 120 may decode a channel (e.g., the PDSCH) that is associated with the signal to obtain the data communication and the system information. In some aspects, the UE 120 may be enabled to decode the data communication at the first SNR and the system information at the second SNR because of the large bandwidth size of the PDSCH and the relatively small size of the system information. In some aspects, the UE 120 may perform SIC to decode the signal. For example, the UE 120 may decode the signal to obtain the data communication. The UE 120 may remove the data communication from the signal via SIC. The UE 120 may decode the signal, after removing the data communication, to obtain the system information. As described elsewhere herein, the UE 120 may selectively decode the signal using SIC based at least in part on a size of the resource allocation, a difference between signal power (e.g., transmit powers) of data and system information, and/or a bandwidth of the signal, among other examples. Additionally, or alternatively, the UE 120 may selectively decode the signal using SIC based at least in part on an indication, from the network node 110, of whether SIC is to be used to decode the signal.

As a result, a signaling overhead associated with transmitting the system information is reduced. For example, the network node 110 may be enabled to transmit system information via beams that are associated with a given UE (e.g., rather than broadcasting the system information via all beams associated with the network node 110). This reduces a quantity of transmissions of the system information, thereby conserving network resources, power resources, and/or other resources that would have otherwise been used transmitting (e.g., broadcasting) the system information via all beams associated with the network node 110. Additionally, this reduces a latency associated with the UE 120 receiving the system information because the UE 120 will not wait for the network node 110 to transmit the system information over all other beams.

The network node 110 may still broadcast the system information (e.g., that is otherwise transmitted via superimposing with unicast data communications) to enable inactive UEs (e.g., UEs without an active RRC connection with the network node 110) to receive the system information. However, the network node 110 may be enabled to broadcast the system information less frequently because UEs that need the system information sooner (e.g., active UEs) are enabled to obtain the system information via the system information that is superimposed on data communications. This conserves network resources, power resources, and/or other resources that would have otherwise been used transmitting (e.g., broadcasting) the system information more frequently.

As indicated above, FIG. 6 is provided as an example. Other examples may differ from what is described with respect to FIG. 6.

Figure 7:
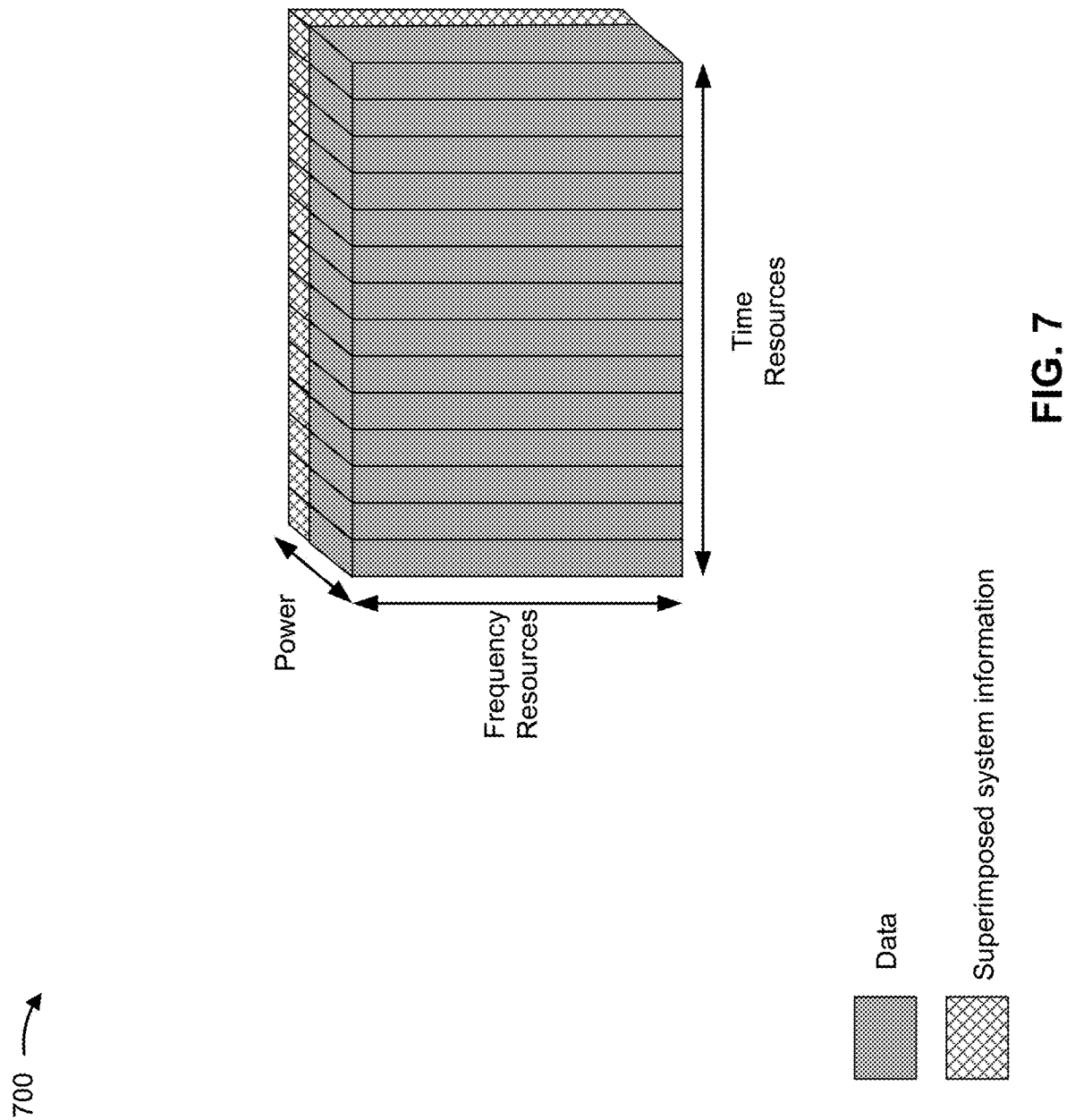
FIG. 7 is a diagram of an example associated with superimposed system information, in accordance with the present disclosure.

FIG. 7 is a diagram of an example 700 associated with superimposed system information, in accordance with the present disclosure. FIG. 7 depicts an example of system information that is superimposed on a resource allocation associated with a data communication.

For example, as described elsewhere herein, the network node 110 may transmit a communication that includes data signaling and superimposed system information, with the superimposed system information being superimposed on the data signaling transmitted via one or more communication resources of the communication. For example, the superimposed system information may not be orthogonal to the data signaling. For example, the superimposed system information may share time and frequency resources and/or coding resources (e.g., orthogonal cover code (OCC) resources) with the data signaling. The superimposed system information may be added on top of data symbols and may share a transmission power resource (e.g., the transmission power may be split between the superimposed system information and the data signaling). In some aspects, for superimposed system information, no resources may be dedicated for only the superimposed system information. Instead, a portion of signal power per resource element may be used for the superimposed system information.

For example, the communication (e.g., a signal) may include the data and system information. In some aspects, the data may be transmitted with more power than the superimposed system information. For example, the superimposed system information may share an available transmission power with the data transmitted via the one or more communication resources. For example, the network node 110 may have a power limit P for each resource (e.g., resource element) of the communication. The network node 110 may configure a first power P1 for transmitting the data and a second power P2 for transmitting the superimposed system information, where a sum of P1 and P2 is P. In some aspects, an amount of power allocated to the data P1 is based at least in part on a number of ports for the superimposed system information.

As indicated above, FIG. 7 is provided as an example. Other examples may differ from what is described with respect to FIG. 7.

Figure 8:
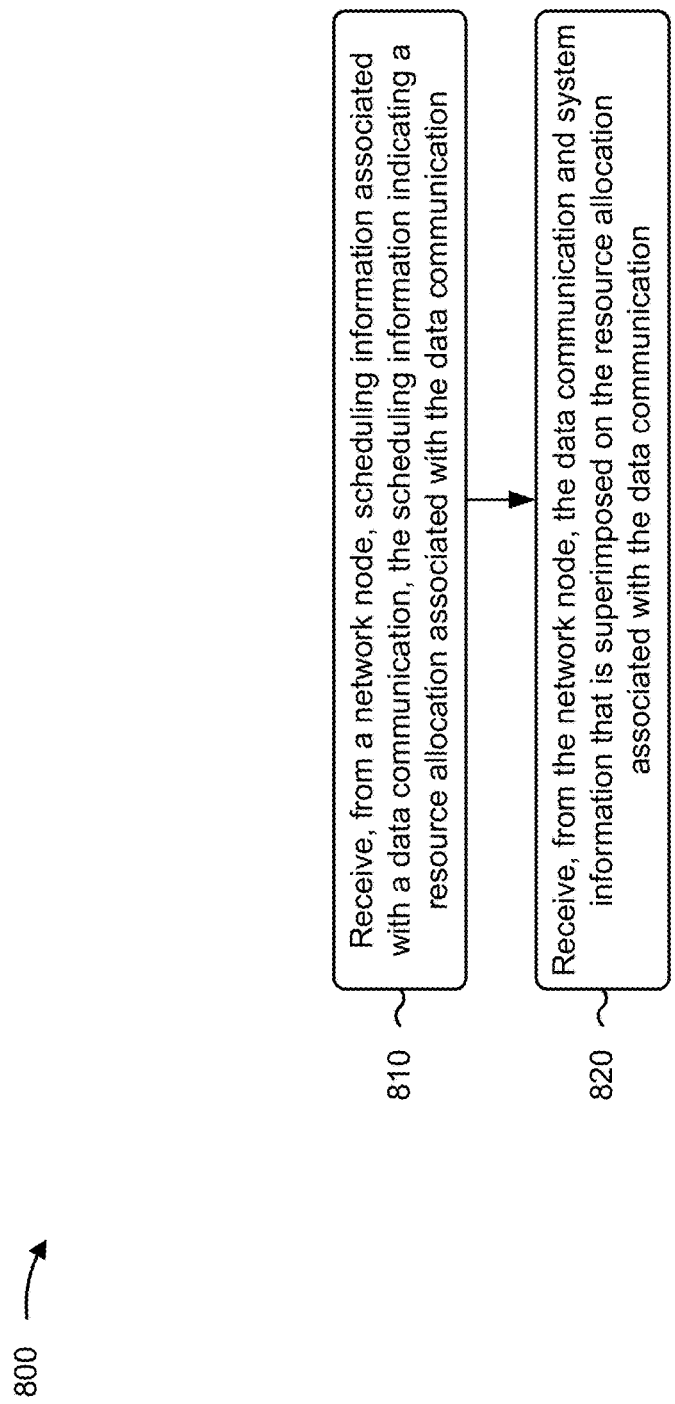
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with superimposed system information.

As shown in FIG. 8, in some aspects, process 800 may include receiving, from a network node, scheduling information associated with a data communication, the scheduling information indicating a resource allocation associated with the data communication (block 810). For example, the UE (e.g., using reception component 1002 and/or communication manager 1006, depicted in FIG. 10) may receive, from a network node, scheduling information associated with a data communication, the scheduling information indicating a resource allocation associated with the data communication, as described above.

As further shown in FIG. 8, in some aspects, process 800 may include receiving, from the network node, the data communication and system information that is superimposed on the resource allocation associated with the data communication (block 820). For example, the UE (e.g., using reception component 1002 and/or communication manager 1006, depicted in FIG. 10) may receive, from the network node, the data communication and system information that is superimposed on the resource allocation associated with the data communication, as described above.

Process 800 may include additional aspects, such as any single aspect or any combination of aspects described below and/or in connection with one or more other processes described elsewhere herein.

In a first aspect, process 800 includes receiving, from the network node, an indication of a timing of a transmission of the system information, wherein receiving the data communication and the system information that is superimposed on the resource allocation is associated with receiving the indication of the timing.

In a second aspect, alone or in combination with the first aspect, the indication of the timing includes an indication of scheduling associated with a set of SIBs to be superimposed with data communications, and the system information is associated with a SIB from the set of SIBs.

In a third aspect, alone or in combination with one or more of the first and second aspects, the indication of the timing is communicated via an RRC communication or a MAC control element communication.

In a fourth aspect, alone or in combination with one or more of the first through third aspects, the data communication is associated with a first signal power, and the system information is associated with a second signal power.

In a fifth aspect, alone or in combination with one or more of the first through fourth aspects, the data communication is associated with a first SNR, and the system information is associated with a second SNR.

In a sixth aspect, alone or in combination with one or more of the first through fifth aspects, a difference between the first signal power and the second signal power satisfies a threshold.

In a seventh aspect, alone or in combination with one or more of the first through sixth aspects, process 800 includes decoding a signal to obtain the data communication and the system information.

In an eighth aspect, alone or in combination with one or more of the first through seventh aspects, decoding the signal includes decoding the signal to obtain the data communication, removing the data communication from the signal via SIC, and decoding the signal, after removing the data communication, to obtain the system information.

In a ninth aspect, alone or in combination with one or more of the first through eighth aspects, decoding the signal includes selectively decoding the signal using SIC based at least in part on at least one of a size of the resource allocation or a difference between signal power (e.g., transmit powers) of the data communication and the system information.

In a tenth aspect, alone or in combination with one or more of the first through ninth aspects, decoding the signal includes receiving, from the network node, an indication of whether SIC is to be used to decode the signal, and selectively decoding the signal using SIC based at least in part on the indication.

In an eleventh aspect, alone or in combination with one or more of the first through tenth aspects, the system information is periodically communicated via superimposing with data communications.

In a twelfth aspect, alone or in combination with one or more of the first through eleventh aspects, the data communication and the system information are communicated via a data channel.

In a thirteenth aspect, alone or in combination with one or more of the first through twelfth aspects, the data channel is a PDSCH.

In a fourteenth aspect, alone or in combination with one or more of the first through thirteenth aspects, the system information includes a SIB.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
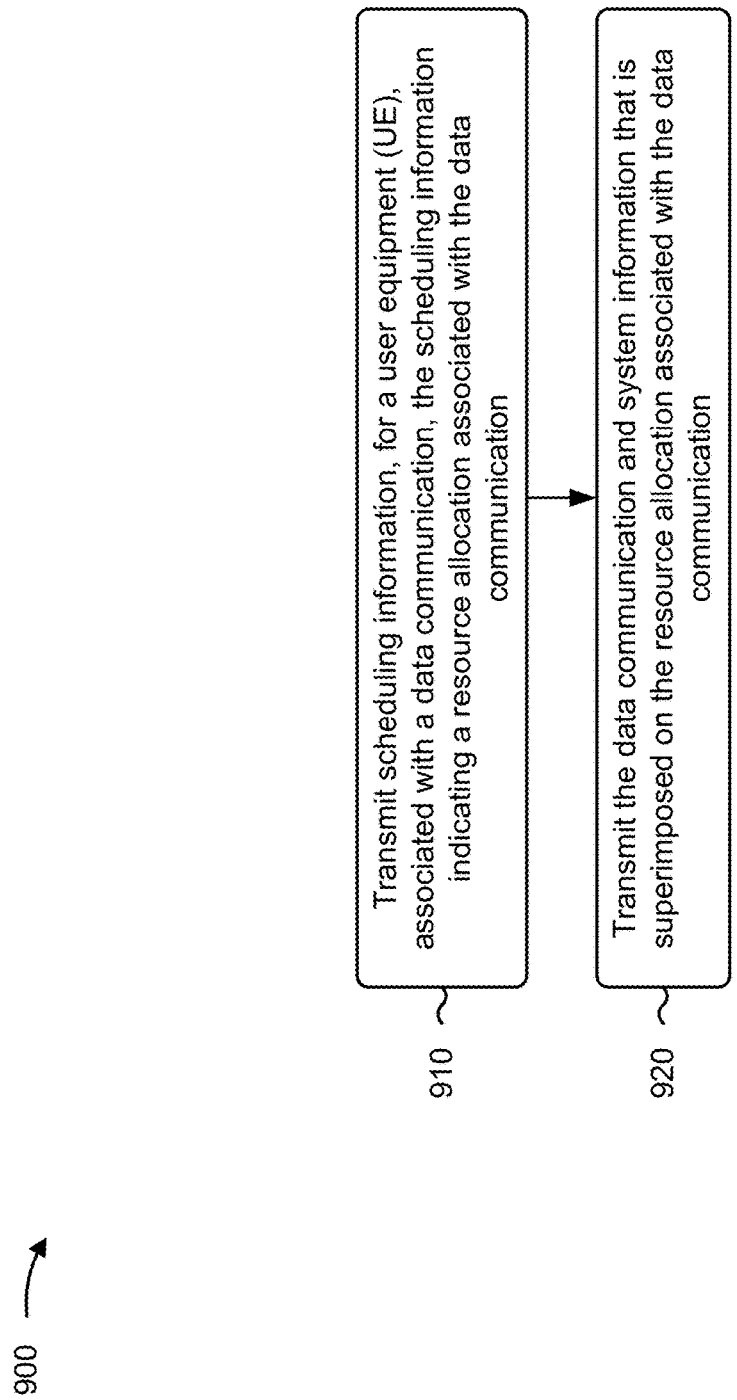
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with superimposed system information.

As shown in FIG. 9, in some aspects, process 900 may include transmitting scheduling information, for a UE, associated with a data communication, the scheduling information indicating a resource allocation associated with the data communication (block 910). For example, the network node (e.g., using transmission component 1104 and/or communication manager 1106, depicted in FIG. 11) may transmit scheduling information, for a UE, associated with a data communication, the scheduling information indicating a resource allocation associated with the data communication, as described above.

As further shown in FIG. 9, in some aspects, process 900 may include transmitting the data communication and system information that is superimposed on the resource allocation associated with the data communication (block 920). For example, the network node (e.g., using transmission component 1104 and/or communication manager 1106, depicted in FIG. 11) may transmit the data communication and system information that is superimposed on the resource allocation associated with the data communication, as described above.

Process 900 may include additional aspects, such as any single aspect or any combination of aspects described below and/or in connection with one or more other processes described elsewhere herein.

In a first aspect, process 900 includes transmitting an indication of a timing of a transmission of the system information.

In a second aspect, alone or in combination with the first aspect, the indication of the timing includes an indication of scheduling associated with a set of SIBs to be superimposed with data communications, and the system information is associated with a SIB from the set of SIBs.

In a third aspect, alone or in combination with one or more of the first and second aspects, the indication of the timing is communicated via an RRC communication or a MAC control element communication.

In a fourth aspect, alone or in combination with one or more of the first through third aspects, a set of SIBs are periodically transmitted via superimposing with respective data communications, and the system information is associated with a SIB from the set of SIBs.

In a fifth aspect, alone or in combination with one or more of the first through fourth aspects, process 900 includes transmitting, via a broadcast communication, at least one of the system information or other system information.

In a sixth aspect, alone or in combination with one or more of the first through fifth aspects, the other system information is associated with a MIB.

In a seventh aspect, alone or in combination with one or more of the first through sixth aspects, the data communication is associated with a first signal power, and the system information is associated with a second signal power.

In an eighth aspect, alone or in combination with one or more of the first through seventh aspects, the data communication is associated with a first SNR, and the system information is associated with a second SNR.

In a ninth aspect, alone or in combination with one or more of the first through eighth aspects, a difference between the first signal power and the second signal power satisfies a threshold.

In a tenth aspect, alone or in combination with one or more of the first through ninth aspects, a code rate of the system information is associated with a decodable code rate for the UE and the second SNR.

In an eleventh aspect, alone or in combination with one or more of the first through tenth aspects, process 900 includes transmitting an indication of whether SIC is to be used by the UE to decode a signal that includes the data communication and the system information.

In a twelfth aspect, alone or in combination with one or more of the first through eleventh aspects, whether SIC is to be used by the UE is based at least in part on at least one of a size of the resource allocation or a difference between signal powers of the data communication and the system information.

In a thirteenth aspect, alone or in combination with one or more of the first through twelfth aspects, the system information is periodically communicated via superimposing with data communications.

In a fourteenth aspect, alone or in combination with one or more of the first through thirteenth aspects, the data communication and the system information are communicated via a data channel.

In a fifteenth aspect, alone or in combination with one or more of the first through fourteenth aspects, the data channel is a PDSCH.

In a sixteenth aspect, alone or in combination with one or more of the first through fifteenth aspects, the system information includes a SIB.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
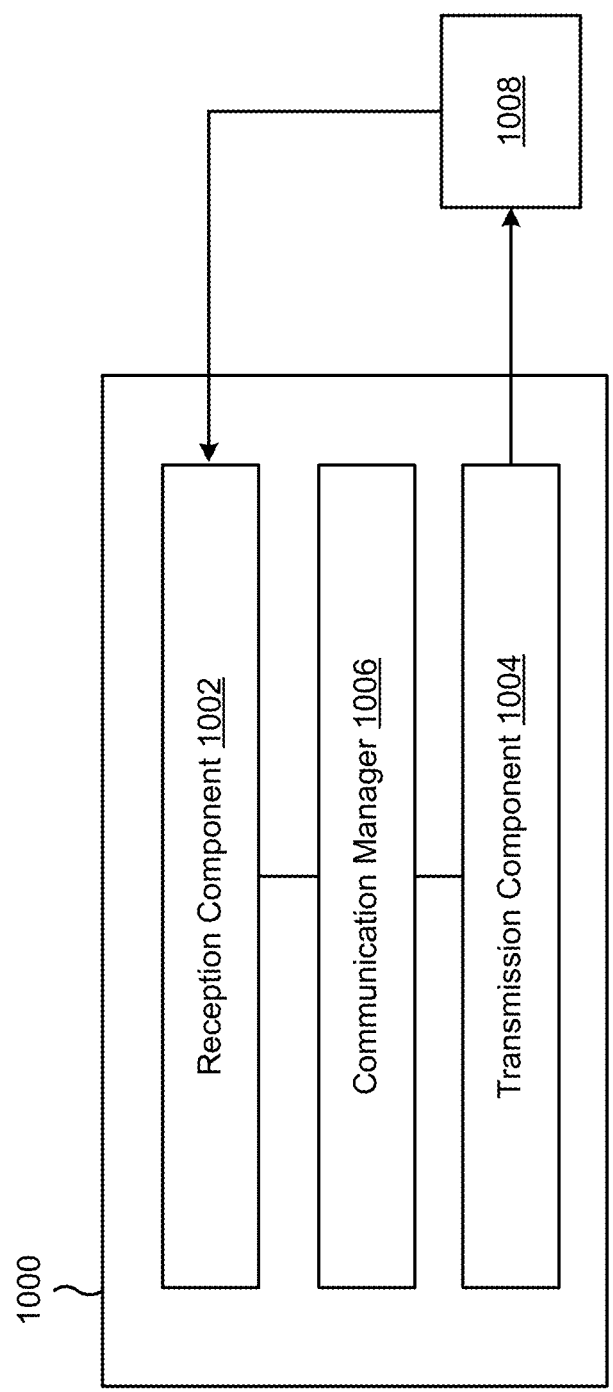
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 6 and 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive, from a network node, scheduling information associated with a data communication, the scheduling information indicating a resource allocation associated with the data communication. The reception component 1002 may receive, from the network node, the data communication and system information that is superimposed on the resource allocation associated with the data communication.

The reception component 1002 may receive, from the network node, an indication of a timing of a transmission of the system information wherein receiving the data communication and the system information that is superimposed on the resource allocation is associated with receiving the indication of the timing.

The communication manager 1006 may decode a signal to obtain the data communication and the system information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
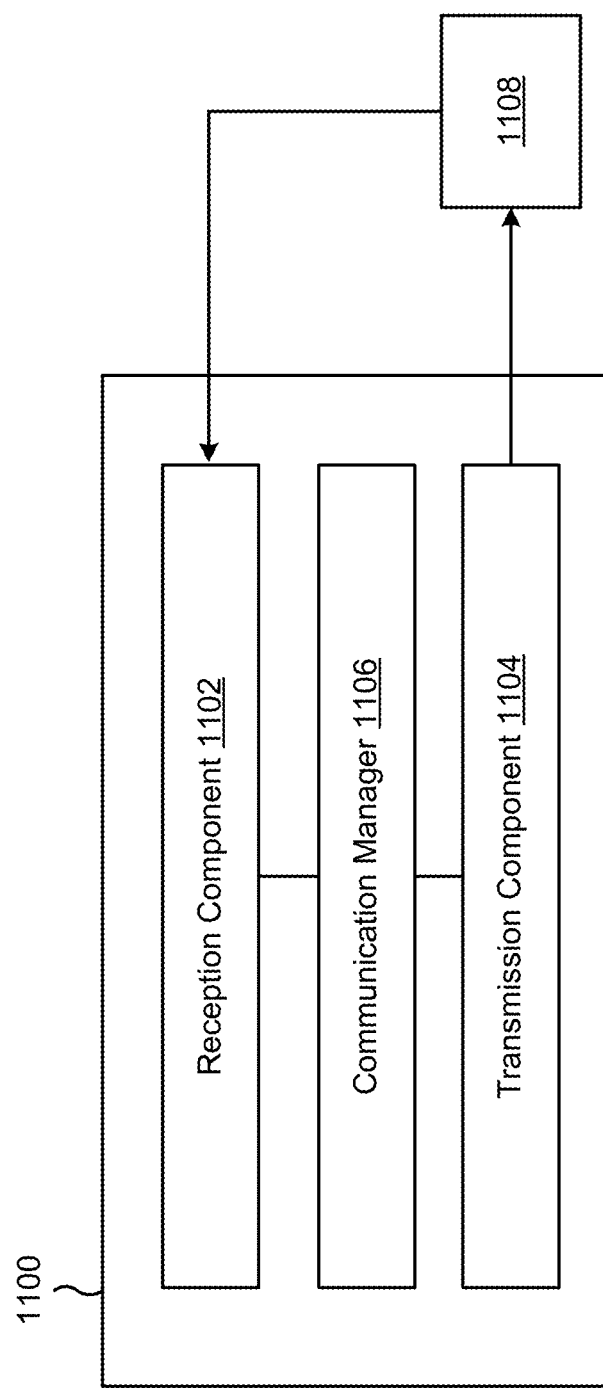
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 6 and 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit scheduling information, for a UE, associated with a data communication, the scheduling information indicating a resource allocation associated with the data communication. The transmission component 1104 may transmit the data communication and system information that is superimposed on the resource allocation associated with the data communication.

The transmission component 1104 may transmit an indication of a timing of a transmission of the system information.

The transmission component 1104 may transmit, via a broadcast communication, at least one of the system information or other system information.

The transmission component 1104 may transmit an indication of whether SIC is to be used by the UE to decode a signal that includes the data communication and the system information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a network node, scheduling information associated with a data communication, the scheduling information indicating a resource allocation associated with the data communication; and receiving, from the network node, the data communication and system information that is superimposed on the resource allocation associated with the data communication.

Aspect 2: The method of Aspect 1, further comprising: receiving, from the network node, an indication of a timing of a transmission of the system information, wherein receiving the data communication and the system information that is superimposed on the resource allocation is associated with receiving the indication of the timing.

Aspect 3: The method of Aspect 2, wherein the indication of the timing includes an indication of scheduling associated with a set of system information blocks (SIBs) to be superimposed with data communications, and wherein the system information is associated with a SIB from the set of SIBs.

Aspect 4: The method of any of Aspects 2-3, wherein the indication of the timing is communicated via a radio resource control (RRC) communication or a medium access control (MAC) control element communication.

Aspect 5: The method of any of Aspects 1-4, wherein the data communication is associated with a first signal power, and wherein the system information is associated with a second signal power.

Aspect 6: The method of Aspect 5, wherein a difference between the first signal power and the second signal power satisfies a threshold.

Aspect 7: The method of any of Aspects 1-6, wherein the data communication is associated with a first signal-to-noise ratio (SNR), and wherein the system information is associated with a second SNR.

Aspect 8: The method of any of Aspects 1-7, further comprising: decoding a signal to obtain the data communication and the system information.

Aspect 9: The method of Aspect 8, wherein decoding the signal comprises: decoding the signal to obtain the data communication; removing the data communication from the signal via successive interference cancellation (SIC); and decoding the signal, after removing the data communication, to obtain the system information.

Aspect 10: The method of any of Aspects 8-9, wherein decoding the signal comprises: selectively decoding the signal using successive interference cancellation (SIC) based at least in part on at least one of a size of the resource allocation or a difference between signal powers of the data communication and the system information.

Aspect 11: The method of any of Aspects 8-10, wherein decoding the signal comprises: receiving, from the network node, an indication of whether successive interference cancellation (SIC) is to be used to decode the signal; and selectively decoding the signal using successive interference cancellation (SIC) based at least in part on the indication.

Aspect 12: The method of any of Aspects 1-11, wherein the system information is periodically communicated via superimposing with data communications.

Aspect 13: The method of any of Aspects 1-12, wherein the data communication and the system information are communicated via a data channel.

Aspect 14: The method of Aspect 13, wherein the data channel is a physical downlink shared channel (PDSCH).

Aspect 15: The method of any of Aspects 1-14, wherein the system information includes a system information block (SIB).

Aspect 16: The method of any of Aspects 1-15, further comprising: transmitting, to the network node, a capability report indicating a decoding capability of the UE associated with decoding superimposed system information.

Aspect 17: The method of Aspect 16, wherein the decoding capability indicates whether the UE supports performing successive interference cancellation (SIC).

Aspect 18: A method of wireless communication performed by a network node, comprising: transmitting scheduling information, for a user equipment (UE), associated with a data communication, the scheduling information indicating a resource allocation associated with the data communication; and transmitting the data communication and system information that is superimposed on the resource allocation associated with the data communication.

Aspect 19: The method of Aspect 18, further comprising: transmitting an indication of a timing of a transmission of the system information.

Aspect 20: The method of Aspect 19, wherein the indication of the timing includes an indication of scheduling associated with a set of system information blocks (SIBs) to be superimposed with data communications, and wherein the system information is associated with a SIB from the set of SIBs.

Aspect 21: The method of any of Aspect 19-20, wherein the indication of the timing is communicated via a radio resource control (RRC) communication or a medium access control (MAC) control element communication.

Aspect 22: The method of any of Aspects 18-21, wherein a set of system information blocks (SIBs) are periodically transmitted via superimposing with respective data communications, and wherein the system information is associated with a SIB from the set of SIBs.

Aspect 23: The method of any of Aspects 18-22, further comprising: transmitting, via a broadcast communication, at least one of the system information or other system information.

Aspect 24: The method of Aspect 23, wherein the other system information is associated with a master information block (MIB).

Aspect 25: The method of any of Aspects 18-24, wherein the data communication is associated with a first signal power, and wherein the system information is associated with a second signal power.

Aspect 26: The method of Aspect 25, wherein a difference between the first signal power and the second signal power satisfies a threshold.

Aspect 27: The method of any of Aspects 18-26, wherein the data communication is associated with a first signal-to-noise ratio (SNR), and wherein the system information is associated with a second SNR.

Aspect 28: The method of any of Aspect 26-27, wherein a code rate of the system information is associated with a decodable code rate for the UE and the second SNR.

Aspect 29: The method of any of Aspects 18-28, further comprising: transmitting an indication of whether successive interference cancellation (SIC) is to be used by the UE to decode a signal that includes the data communication and the system information.

Aspect 30: The method of Aspect 29, wherein whether SIC is to be used by the UE is based at least in part on at least one of a size of the resource allocation or a difference between signal powers of the data communication and the system information.

Aspect 31: The method of any of Aspects 18-30, wherein the system information is periodically communicated via superimposing with data communications.

Aspect 32: The method of any of Aspects 18-31, wherein the data communication and the system information are communicated via a data channel.

Aspect 33: The method of Aspect 32, wherein the data channel is a physical downlink shared channel (PDSCH).

Aspect 34: The method of any of Aspects 18-33, wherein the system information includes a system information block (SIB).

Aspect 35: The method of any of Aspects 18-34, further comprising: receiving a capability report, associated with the UE, indicating a decoding capability of the UE associated with decoding superimposed system information.

Aspect 36: The method of Aspect 35, wherein the decoding capability indicates whether the UE supports performing successive interference cancellation (SIC).

Aspect 37: An apparatus for wireless communication at a device, comprising a processor; memory coupled with the processor; and instructions stored in the memory and executable by the processor to cause the apparatus to perform the method of one or more of Aspects 1-17.

Aspect 38: A device for wireless communication, comprising a memory and one or more processors coupled to the memory, the one or more processors configured to perform the method of one or more of Aspects 1-17.

Aspect 39: An apparatus for wireless communication, comprising at least one means for performing the method of one or more of Aspects 1-17.

Aspect 40: A non-transitory computer-readable medium storing code for wireless communication, the code comprising instructions executable by a processor to perform the method of one or more of Aspects 1-17.

Aspect 41: A non-transitory computer-readable medium storing a set of instructions for wireless communication, the set of instructions comprising one or more instructions that, when executed by one or more processors of a device, cause the device to perform the method of one or more of Aspects 1-17.

Aspect 42: An apparatus for wireless communication at a device, comprising a processor; memory coupled with the processor; and instructions stored in the memory and executable by the processor to cause the apparatus to perform the method of one or more of Aspects 18-36.

Aspect 43: A device for wireless communication, comprising a memory and one or more processors coupled to the memory, the one or more processors configured to perform the method of one or more of Aspects 18-36.

Aspect 44: An apparatus for wireless communication, comprising at least one means for performing the method of one or more of Aspects 18-36.

Aspect 45: A non-transitory computer-readable medium storing code for wireless communication, the code comprising instructions executable by a processor to perform the method of one or more of Aspects 18-36.

Aspect 46: A non-transitory computer-readable medium storing a set of instructions for wireless communication, the set of instructions comprising one or more instructions that, when executed by one or more processors of a device, cause the device to perform the method of one or more of Aspects 18-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
  one or more memories; and
  one or more processors, coupled to the one or more memories, configured to cause the UE to:
    receive, from a network node, scheduling information associated with a data communication, the scheduling information indicating a resource allocation associated with the data communication;
    receive, from the network node, the data communication and system information that is superimposed on the resource allocation; and
    decode a signal to obtain the data communication and the system information.

2. The UE of claim 1,
wherein the one or more processors are further configured to cause the UE to:
receive, from the network node, an indication of a timing of a transmission of the system information, wherein receiving the data communication and the system information is associated with receiving the indication of the timing.

3. The UE of claim 2,
wherein the indication of the timing includes an indication of scheduling associated with a set of system information blocks (SIBs) to be superimposed with data communications, wherein the system information is associated with a SIB from the set of SIBs.

4. The UE of claim 1,
wherein the data communication is associated with a first signal power, and
wherein the system information is associated with a second signal power.

5. The UE of claim 4,
wherein a difference between the first signal power and the second signal power satisfies a threshold.

6. The UE of claim 1,
wherein the data communication is associated with a first signal-to-noise ratio (SNR), and
wherein the system information is associated with a second SNR.

7. The UE of claim 1,
wherein, to decode the signal, the one or more processors are configured to cause the UE to:
decode the signal to obtain the data communication;
remove the data communication from the signal via successive interference cancellation (SIC); and
decode the signal, after removing the data communication, to obtain the system information.

8. The UE of claim 1,
wherein the system information is periodically communicated via superimposing with data communications.

9. The UE of claim 1,
wherein the one or more processors are further configured to cause the UE to:
transmit, to the network node, a capability report indicating a decoding capability of the UE associated with decoding superimposed system information.

10. The UE of claim 6, wherein a code rate of the system information is associated with a decodable code rate for the UE and the second SNR.

11. A network node for wireless communication, comprising:
one or more memories; and
one or more processors, coupled to the memory, configured to cause the network node to:
receive a capability report indicating a decoding capability of a user equipment (UE) associated with decoding superimposed system information;
transmit, based at least in part on the capability report, scheduling information, for the UE, associated with a data communication, the scheduling information indicating a resource allocation associated with the data communication; and
transmit, based at least in part on the capability report, the data communication and system information that is superimposed on the resource allocation.

12. The network node of claim 11,
wherein the one or more processors are further configured to cause the network node to:
transmit an indication of a timing of a transmission of the system information.

13. The network node of claim 11,
wherein a set of system information blocks (SIBs) are periodically transmitted via superimposing with respective data communications, wherein the system information is associated with a SIB from the set of SIBs.

14. The network node of claim 11,
wherein the data communication is associated with a first signal-to-noise ratio (SNR), and
wherein the system information is associated with a second SNR.

15. The network node of claim 14,
wherein a code rate of the system information is associated with a decodable code rate for the UE and the second SNR.

16. The network node of claim 11,
wherein the data communication is associated with a first signal power, and
wherein the system information is associated with a second signal power.

17. A method of wireless communication performed by a user equipment (UE), comprising:
receiving, from a network node, scheduling information associated with a data communication, the scheduling information indicating a resource allocation associated with the data communication;
receiving, from the network node, the data communication and system information that is superimposed on the resource allocation; and
decoding a signal to obtain the data communication and the system information.

18. The method of claim 17, further comprising:
receiving, from the network node, an indication of a timing of a transmission of the system information,
wherein receiving the data communication and the system information is associated with receiving the indication of the timing.

19. The method of claim 18,
wherein the indication of the timing includes an indication of scheduling associated with a set of system information blocks (SIBs) to be superimposed with data communications, wherein the system information is associated with a SIB from the set of SIBs.

20. The method of claim 17,
wherein the data communication is associated with a first signal power, and
wherein the system information is associated with a second signal power.

21. The method of claim 20,
wherein a difference between the first signal power and the second signal power satisfies a threshold.

22. The method of claim 17,
wherein the data communication is associated with a first signal-to-noise ratio (SNR), and
wherein the system information is associated with a second SNR.

23. The method of claim 17,
wherein decoding the signal comprises:
decoding the signal to obtain the data communication;
removing the data communication from the signal via successive interference cancellation (SIC); and
decoding the signal, after removing the data communication, to obtain the system information.

24. The method of claim 17,
wherein the system information is periodically communicated via superimposing with data communications.

25. The method of claim 17,
wherein the data communication and the system information are communicated via a data channel.

26. A method of wireless communication performed by a network node, comprising:
receiving a capability report indicating a decoding capability of a user equipment (UE) associated with decoding superimposed system information;
transmitting, based at least in part on receiving the capability report, scheduling information, for the UE, associated with a data communication, the scheduling information indicating a resource allocation associated with the data communication; and
transmitting, based at least in part on receiving the capability report, the data communication and system information that is superimposed on the resource allocation.

27. The method of claim 26, further comprising:
transmitting an indication of a timing of a transmission of the system information.

28. The method of claim 26,
wherein a set of system information blocks (SIBs) are periodically transmitted via superimposing with respective data communications, wherein the system information is associated with a SIB from the set of SIBs.

29. The method of claim 26,
wherein the data communication is associated with a first signal-to-noise ratio (SNR), and
wherein the system information is associated with a second SNR.

30. The method of claim 29,
wherein a code rate of the system information is associated with a decodable code rate for the UE and the second SNR.

* * * * *